Figure 1:
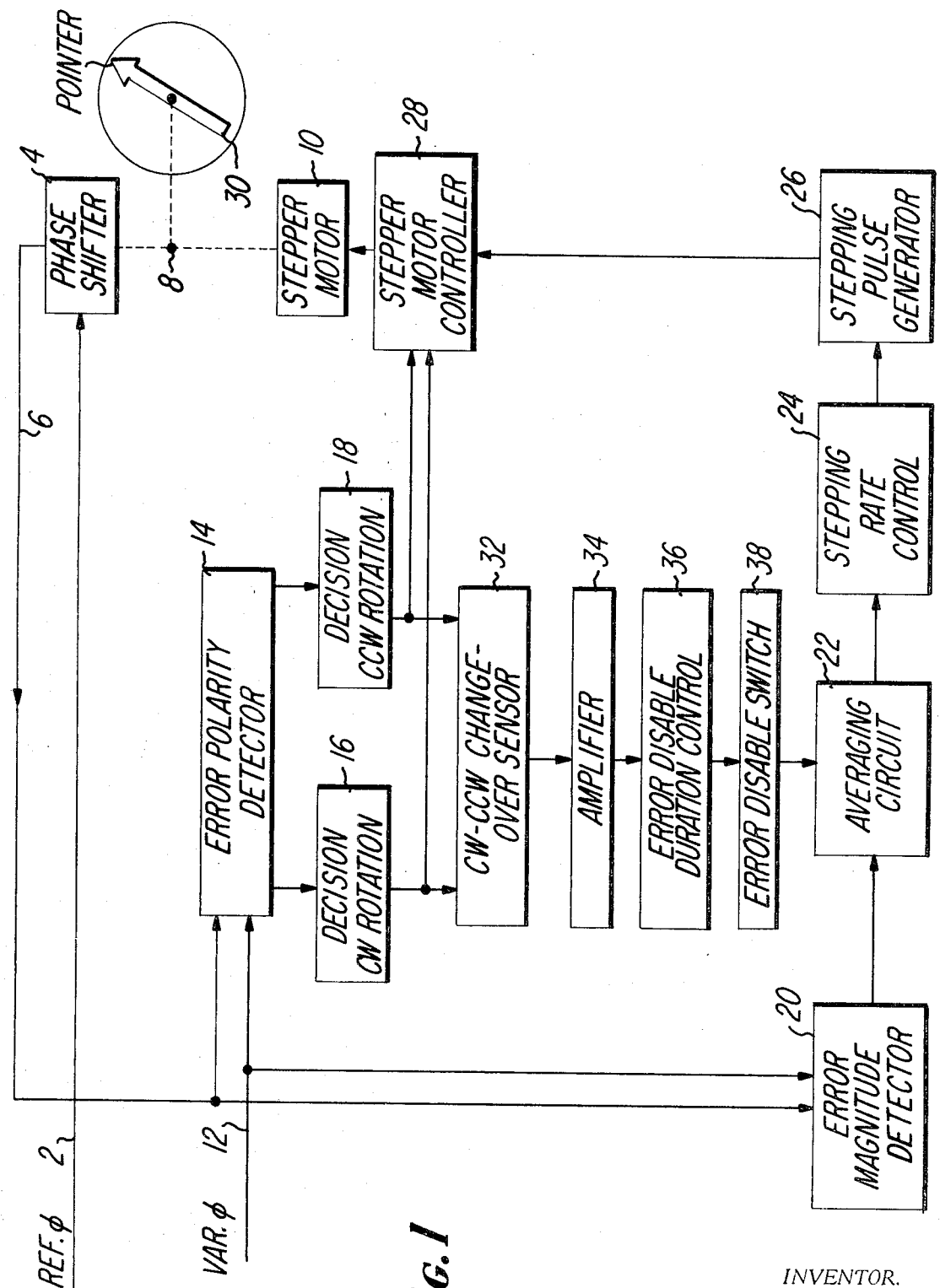

United States Patent
Masse et al.

[15] 3,683,254
[45] Aug. 8, 1972

[54] SERVO SYSTEM WITH NOISE CANCELLATION

[72] Inventors: Michel Stephane Masse, Hollywood; James Paul McDowell, Los Angeles, both of Calif.

[73] Assignee: RCA Corporation

[22] Filed: Feb. 22, 1971

[21] Appl. No.: 117,552

[52] U.S. Cl. ............. 318/608, 318/616, 318/685
[51] Int. Cl. ........................................ G05b 1/01
[58] Field of Search ...... 318/580, 563, 608, 616, 617, 318/685

[56] References Cited

UNITED STATES PATENTS

| | | |
|---|---|---|
| 3,492,551 | 1/1970 | Rouxel et al. ............ 318/563 |
| 3,166,691 | 1/1965 | McGee .................... 318/563 X |
| 3,379,944 | 4/1968 | Nuttall et al. ............ 318/608 X |
| 2,861,177 | 11/1958 | Dishal et al. ............. 318/608 X |
| 3,466,516 | 9/1969 | Goplen et al. ........... 318/563 X |

*Primary Examiner*—Benjamin Dobeck
*Attorney*—Edward J. Norton

[57] ABSTRACT

An arrangement for reducing the effect on system performance due to noise in a servo system, wherein an output device is driven in accordance with an error signal, with the output device generating feedback signal to reduce the error. A quantity of direction sense reversals of the error signal due to noise is monitored and utilized to provide controlled velocity limiting of the drive means for a given duration.

9 Claims, 3 Drawing Figures

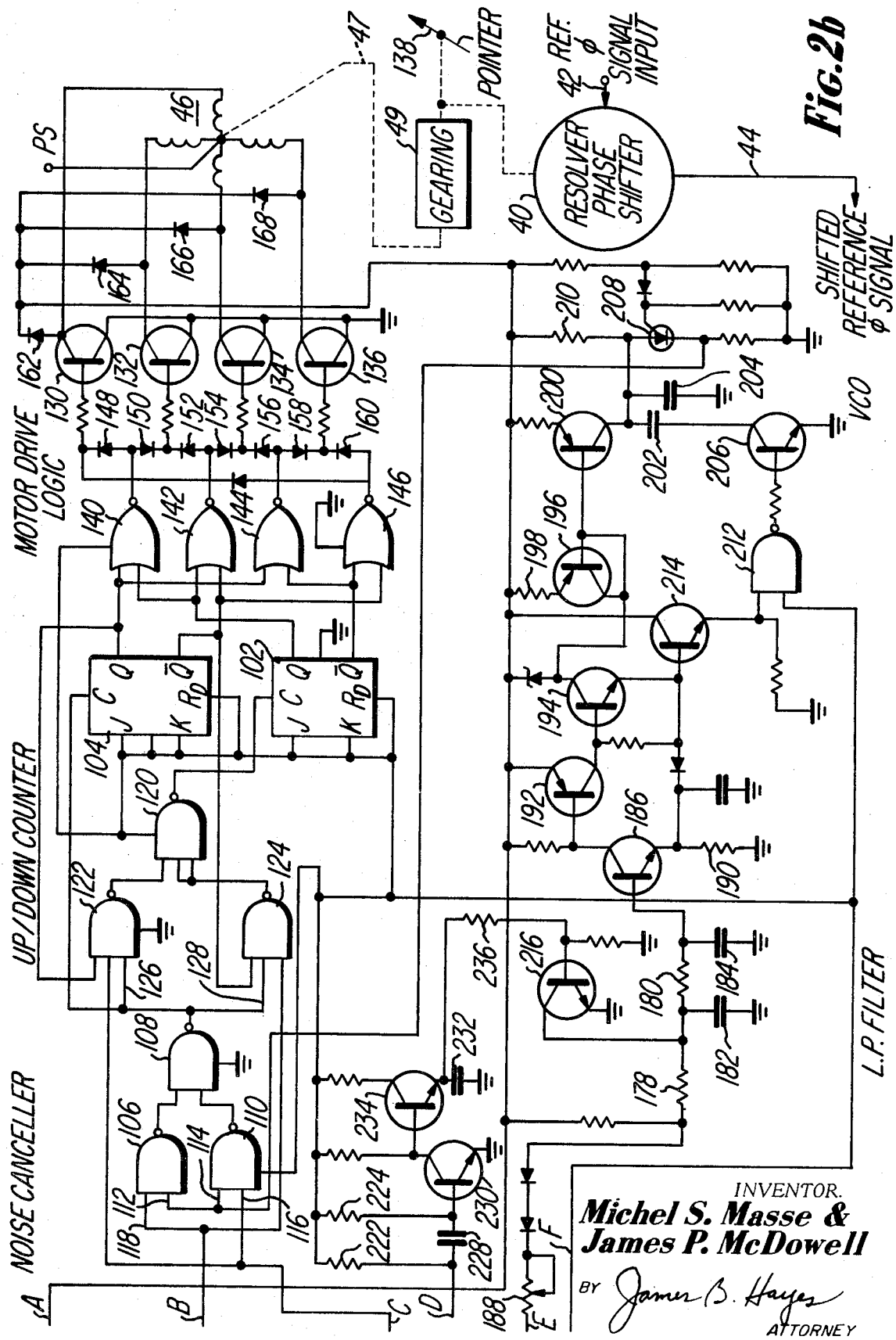

SERVO SYSTEM WITH NOISE CANCELLATION

This invention relates to servo systems and, more particularly, to servo systems of the type wherein an output device is driven in accordance with an error signal, the output device including means employed to generate negative feedback to reduce the error signal.

In existing servo systems such as those utilized, for example, to position a shaft or indicator or to operate some other type of display device, noise introduced into the system tends to cause inaccurate tracking of the error, "hunting", and other undesirable distortions of system performance. These difficulties and problems are substantially decreased with the arrangement of the present invention, which provides automatic noise cancellation. Tracking of the error is achieved at all times through the noise cancellation which influences velocity of the driving means for the servo system. Because of the velocity control imposed, the excursions of the output device are limited whenever the system is subjected to noise. In the case for example where the output device is a pointer, the pointer will not move about the null position by a substantial amount even with a poor quality input signal.

Any disturbance of signals that would provoke abnormal number of rotation sense reversals is recognized by the system as noise. Noise cancellation is not limited to excessive amplitude, excessive change of rate, or to poor signal to noise ratio. It is applicable to short duration instabilities, such as those due to jitter and space propagation interferences, which are superimposed on an otherwise acceptable signal. An accurate null is always obtained, even in marginal signal quality since the speed of the drive means is reduced, however the direction sense for the drive means continues to operate. In the presence of pure random noise, the occurrence of clockwise and counter-clockwise directions sense signals tend to be equal over a period of time. The presence of valid error signal within the noise, will contribute a larger number of pulses in the direction which will tend to nullify the error, thus tracking is achieved. Position overshoot is greatly minimized and hunting of the servo system limited, by sensing the abnormal quantity of direction sense reversals and subsequently limiting the speed of the driving means, such that erratic movements of the output device are not perceptible. Thus within the boundaries or limits of the servo system arrangement of the present invention, there is no limit in error magnitude and/or rate of change of error, to which the system fails to respond. In fact, the larger the error the faster the system responds. Noise cancellation is achieved in the proximity of the error null independent of noise amplitude. Noise does not inhibit the operation of the system regardless of its type and/or magnitude. Minimization of hunting of the system is achieved without the need to resort to the provision of a "dead zone".

In accordance with the present invention there is provided a servo system including drive means for controlling output means in response to an error. The output means includes feedback signal means to reduce the error. Means are provided for generating second and third signals indicative respectively of the magnitude and polarity of the error. Means coupled to the drive means and responsive to the third signal control the direction of rotation of the drive means. Means are coupled to the drive means and responsive to the second signal for providing continuously an energizing signal to the drive means. And coupled to the energizing means are means responsive to the third signal, for limiting to a given value the energizing signal applied to the drive means, in the presence of error polarity reversal indications of the third signal.

In the drawing:

FIG. 1 is a block diagram of a servo system in accordance with the present invention.

Figure 2A:
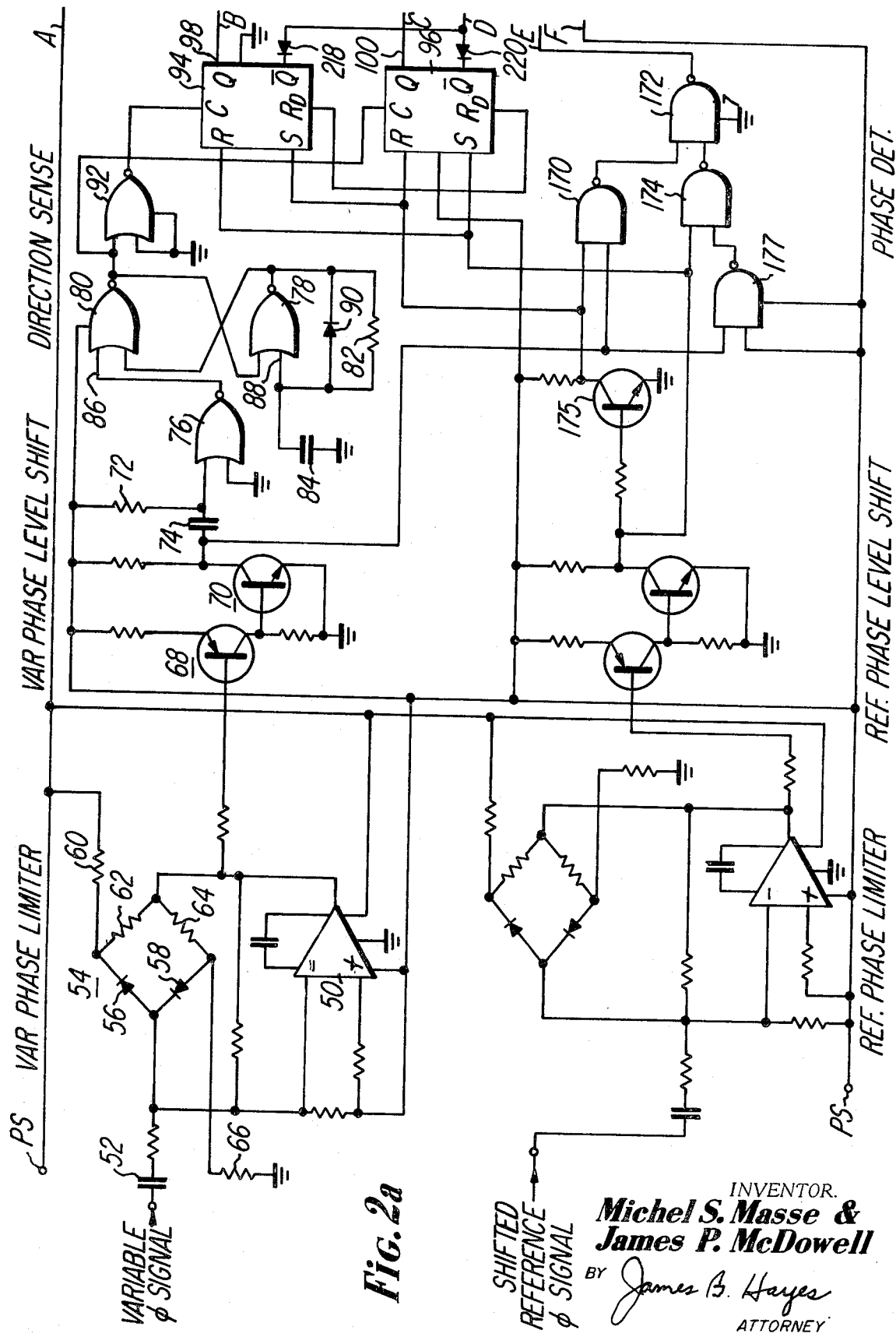

FIG. 2a and b are, taken together, a partial schematic and partial diagrammatic view of the elements for one embodiment of the invention.

Although not limited thereto, for purposes of explanation, the invention will be discussed as it may be implemented for positioning an indicator representative of direction information in a navigation system. Typically in such a navigation system a composite frequency multiplex signal comprises, for example, a 30HZ variable phase signal and a carrier frequency modulated at the 30Hz rate of a reference phase signal. The direction or bearing information contained in the composite signal is the degree of phase difference between the variable phase signal and the reference phase signal. Therefore, to derive the bearing information, the demodulated reference phase signal is phase shifted, for example by means of a resolver driven by a stepper motor which is servoed, to cause the shifted reference phase signal to be in phase with the variable phase signal. A pointer or indicator, coupled to the phase shifting means indicates the extent of the phase shift and therefore the bearing information. For present purposes the respective signals designated "reference phase signal" and the "variable phase signal" will be considered as system inputs. That is, it will be assumed that the variable phase signal has been separated from the modulated carrier and the sub-carrier signal is demodulated to produce the reference phase signal, by suitable existing circuitry which for purposes of simplifying the description is not shown herein.

In FIG. 1 the reference phase signal on lead 2 is provided as an input to a variable phase shifter device 4 which for example may be a resolver. The output of phase shifter 4 on lead 6 is the reference phase signal, phase shifted by an amount determined by the control input of the phase shifter 4. In the present arrangement the control input of the phase shifter 4 is the position of the shaft 8, as established by a driving means 10 here for example shown as a stepper motor.

The shifted reference phase signal on lead 6 and the variable phase signal on lead 12 are applied to the error polarity detector 14. The polarity detector 14 provides polarity information to enable, either the clockwise or the counter clockwise rotation decision circuitry 16 and 18, respectively, to thereby enable the servo to cancel or nullify the phase difference between the shifted reference phase signal and the variable phase signal inputs. The error magnitude detector 20 senses the magnitude of the phase difference or error, between the variable phase signal and the shifted reference phase signal inputs thereto.

The output of the error magnitude detector 20 is fed through an averaging circuit, which for example may be a filter or integrator, to the stepping rate control means 24, which controls the output pulse rate of a stepping pulse generator 26. The output of the stepping pulse generator 26 is fed to the stepper motor controller 28, which in conjunction with output of rotation direction decision circuitry 16 and 18 controls the energization of the stepper motor 10. Generally the greater the error or phase difference between the variable phase signal and shifted reference phase signal, the higher is the pulse repetition rate of stepping pulse generator 26 and therefore the more rapidly the motor 10 will rotate. For zero error or phase difference, the output of the stepping pulse generator 26 is maintained at a given minimum rate, but since there is no decision of rotation direction present from the means 16 or 18, the motor 10 will be substantially motionless. The pointer 30, which is also driven by the stepper motor 10, is positioned in response to the phase difference between the reference phase and variable phase inputs, and thus is indicative of the desired direction information.

In a noiseless system, the cycle would be complete at this point, or at least until a new error or phase difference between the reference phase and variable phase signal inputs is presented to the system. In practice, however, noise from various sources is frequently present with the signals. The noise effects the servo system in a plurality of ways. For example, alternate clockwise and counter clockwise decisions are taken by the polarity sensitive circuitry, with the frequency of changeovers being a function of the signal to noise ratio. Also, accumulation of error or phase difference detection into the averaging circuitry, results in high stepping rates and thus large and numerous excursions of the stepper motor. In the present arrangement, a means 32 is provided for sensing clockwise and counter clockwise changeovers of the rotation decision circuitry 16 and 18. The resulting signal output of the means 32 is fed through an amplifying means 34 and processed in the error disable duration control circuitry 36. The output of the circuitry 36 controls the error disable switch 38. The error disable switch 38 is utilized to limit the value of accumulated error in the averaging circuitry 22 which is caused by undesired noise in the system. The limiting or inhibiting of the build up of accululated phase error in the averaging circuit is effective in keeping the stepping pulse rate to the motor 10 from generator 26 at a low pulse rate. The duration control 36 provides the necessary attenuation of the signal in the averaging circuit 22 for desired system operation. For a very noisey signal, the input to the averaging circuit is effectively disabled or grounded, with the speed of motor 10 therefore being limited to a predetermined value that is preset for a quiescent condition. In practice of the invention, a suitable minimum stepping rate has been found to be approximately 10-15 pulses per second although higher or lower rates may be utilized. Typical duration for disabling or inhibiting the operation of averaging circuit 22 has been found to be in order of 100 milliseconds, although the duration may be selected for any particular system requirements. As the polarity detector 14 operates continuously the system will position at an average null obtained, when the signals fed to the controller 28 from circuitry 16 and 18 are substantially equally distributed between the clockwise and counter clockwise inputs.

Thus a system is provided which effectively cancels the undesirable effects due to noise. The noise causes a plurality of polarity reversals of the error, with a corresponding undesirable build up of error magnitude indication in the averaging circuit 22, which if unaltered, results in large and frequent excursions of the drive motor 10. However, in the present arrangement these error polarity reversals are sensed and utilized to limit the continuous drive to the motor 10, by inhibiting magnitude error signal build up in the averaging circuitry 22 for a given period.

If reference is made to FIG. 2, there is shown an embodiment of detailed circuitry which may be utilized in implementing a system such as shown and described in FIG. 1. In FIG. 2 the titles appearing adjacent the circuitry, indicate the function performed by various portions of the circuitry of FIG. 2. The variable phase limiter converts the variable phase ac signal input to a square wave while conserving the phase information. Following the limiter, the information carried by the variable phase square wave is in two dc levels. The level shift interfaces the variable phase square wave from the preceeding circuits, with the logic circuits following. The logic circuits are sensitive to dc level. The reference phase shifter is implemented with a resolver 40. The reference phase ac signal input on lead 42 is applied to the rotor of the resolver 40. The signal output, on lead 44 from the stator of the resolver 40, is related to the angular position of the rotor of the resolver 40. The degree of phase shift of the reference phase signal on lead 44 is equal to the angle of displacement of the rotor shaft from an index position. The shifted reference phase limiter converts the shifted reference phase signal to a square wave, while preserving the phase information. The square wave phase is in two dc levels. The level shift interfaces the shifted reference phase square wave to the dc level sensitive logic which follows. For the direction sense and up/down counter portion of the circuitry, a pulse source, preferably a voltage controlled oscillator (VCO), sets the rate of cycling through the four stages of the up/down counter. Whether the up/down counter is stopped, cycles up or cycles down, is determined by the signals from the direction sense circuitry. The direction sense circuitry determines whether the shifted reference phase square wave signal is lagging, leading or substantially in phase with the variable phase square wave signal. If it is lagging, the up/down counter is cycled up through its states. If it is leading, the up/down counter is cycled down through its states. If there is substantial phase coincidence, the up/down counter is inhibited from changing states. The motor drive logic decodes or matches each of the four states of the up/down counter to certain ones of the stators or windings of a stepper motor 46. Hence, it is possible to selectively energize the stepper motor windings by setting the counter to their equivalent state. By cycling the up/down counter to an increasing or decreasing sequence of states, the direction of sequence of the stepper motor 46 winding energization is controlled. The sequence direction of the energization determines rotational direction of the stepper motor 46. Thus, the direction sense directs the stepper motor 46 when to turn and determines in which direction it should turn. The pulse generator (VCO) determines the rate or RPM at which the stepper motor 46 turns. The up/down counter in the motor drive logid interprets the direction sense command for the stepper motor 46.

To complete the servo loop, the stepper motor 46 is mechanically linked 47 through gearing 49 to the phase shift resolver 40 and pointer 138. When a phase error is detected, the direction sense commands the stepper motor 46 to turn; the direction depends on whether the reference phase signal is leading or lagging the variable phase signal. The angular position of the rotor of the resolver 40 is changed, until the shifted reference phase signal is in phase with the variable phase signal. At this time the direction sense stops the motor. The phase detector continuously monitors the degree of phase shift difference between the variable phase square wave signal and the shifted reference phase square wave signal. From the phase detector, a low pass filter or integrator passes a dc signal component proportional to the phase difference. The pulse repetition frequency of the VCO is controlled by the dc component from the phase detector. The VCO pulse rate, for example, is approximately 400Hz for large errors, and slows to approximately 10–15 Hz at zero phase error. When the variable phase and shifted reference phase signals are substantially in phase, the direction sense may issue a random sequence of up and down commands. These commands are detected by the noise canceller which limits the phase detector output (low pass filter input) to a minimum value, thereby decreasing the VCO frequency to a predetermined minimum rate. Since the random commands from the direction sense cycle the up/down counter at the pulse repetition rate of the VCO, operating the VCO at a low pulse repetition rate offers the additional advantage of allowing the up/down counter to ignore a substantial portion of the random commands from the direction sense.

The content and operation of the circuitry shown in FIG. 2 will now be described in further detail. The variable phase signal input is applied to amplifier 50 through coupling capacitor 52. The amplifier 50 produces a square wave output from the variable phase signal input which for example may be substantially a sine wave. A feedback bridge network 54 clamps the output swing, preventing saturation of the amplifier 50. In the quiescent condition, diodes 56 and 58 are back biased by the voltage distribution of the resistive divider comprising resistors 60–66. The amplifier 50 linearly amplifies the signal applied at its input by a voltage gain such as 1,000, until the output of the amplifier 50 reaches a level that will render diodes 56 or 58 conducting. At this time, a large negative feedback is applied across the device, and the voltage gain is reduced nearly to unity. The square wave output of the variable phase limiter is referenced to a supply voltage and is applied to the base of transistor 68. When the output of the limiter switches low, transistor 68 conducts, driving transistor 70 into saturation. When the output of the limiter is high, transistor 68 is cut off, and the collector of transistor 70 switches high. The operation of the reference phase limiter and the reference phase level shift circuitry, to which the shifted reference signal is applied, operates in substantially the same manner as just described for the variable phase limiter and level shift circuitry, and therefore need not be described in detail here.

The direction sense circuitry substantially comprises two circuits; a sample and a hold circuit. The falling edge of the variable phase square wave from the collector of transistor 70 is differentiated by the resistor 72 and capacitance 74 to form a negative going trigger pulse. The pulse is inverted in NOR gate 76 and used to initiate a sample pulse, which for example may be 50–90 microseconds in duration. A latching arrangement, comprising cross coupled NOR gates 78 and 80 has only one stable state, because of the resistor capacitor feedback network connected to element 78. The latch is in a stable state when the output of gate 80 is high and the output of gate 78 is low. The input 86 of gate 80 is always low, except during the trigger pulse period. Upon application of the trigger pulse, the regenerative action in the cross coupled gates causes the output of gate 80 to go low and the output of gate 78 to switch high. The output of gate 78 can remain high only for the time that capacitance 84 takes to charge to the gate switching threshold through resistor 82. When the voltage on input pin 88 of gate 78, exceeds the switching threshold of the gate, the voltage at the output of gate 78 falls low, discharging capacitance 84 through diode 90. Regenerative action of the cross couple gates simultaneously drives the output of gate 80 high. The latch remains in this state until another trigger pulse repeats the cycle. The resistor 82 and capacitance 84 determine a sample pulse duration of approximately 70 microseconds. Diode 90 also serves as a dc bypass for the gate input leakage current. Gate 92 is used as an inverter so that both the sample pulse and its inversion are available. The hold circuitry is a further part of the direction sense circuitry. The hold circuitry comprises two RS/T type binaries (flip flops). The element 94 is the down control binary while the element 96 is the up control binary. These binaries accept input data (applied at the R, S inputs) during a negative going transition at their clock inputs (C). The negative going edge that clocks each binary is separated by the sample pulse width, which corresponds to a given phase displacement such as 0.75° between the variable and the reference phase signals. The reference phase square wave is applied to the R input of the down control binary 94, with the inverted reference phase applied to the S input of element 94. In the falling edge of the reference phase square wave occurs after the negative going transition of the down control binary clock pulse, the down control output on pin 98 is high. The down control binary 94 remains high until the reference phase square wave is phase shifted so that its falling edge occurs before the negative going transition of the clock pulse. With regard to the operation of the up control binary 96, the up control output at pin 100 will be high, if the falling edge of the reference phase square wave occurs before the negative going clock pulse transition to the up control binary 96. The up control binary remains high until the reference signal phase square wave if phase shifted so that its falling edge occurs after the negative going transition of the clock pulse. Both the up and down binary outputs of the direction sense will be low, when the falling edge of the reference phase square wave occurs during the sample pulse, at which time the variable and reference phase signals are considered to be in phase.

The up/down counter as shown is a modified two bit ripple counter which can be made to count in either the up (forward) or down (reverse) direction. Up counting is accomplished when the trigger input to the second binary 102 is controlled by the Q output of the first binary 104. The count will proceed in the down direction if the trigger is controlled by the $\bar{Q}$ output. Also, the counter may be stopped from counting by appropriate control of its gating logic. Whether the counter will count and in which direction, is determined by inputs from the direction sense circuitry to the two control gates of the up/down counter. The speed (or rate) of the counting is determined by the pulse repetition rate of the clock (VCO). The control of the clock pulses to the first binary 104 is performed by an AND-OR transmission gate which is shown as implemented by NAND gates 106, 108 and 110. Clock pulses are applied simultaneously to pin 112 of gate 106 and pin 114 of gate 110. If both the count up line (pin 116 of gate 110) and the countdown line (118 of gate 106) from the direction sense are low, the clock will not be transmitted to the AND-OR gate output of gate 108. If either the count up or count down line is high, the clock pulses will be transmitted through the AND-OR gate to the clock input (C) of the first binary 104. Binary 104 is a J-K type binary connected in a manner to change state (toggle) upon the application of a clock pulse. The outputs of the binary are routed to a second AND-OR transmission gate comprising NAND gates 120–124. These gates control the direction that the counter will count. That is, if the clock pulse to binary 102 is controlled by the Q output from the first binary 104, the counter will count up, but if the clock pulse is controlled by the $\bar{Q}$ output, the counter will count down. The clock pulses from the first transmission gate (106–110) are applied simultaneously to pin 126 of gate 122 and pin 128 of gate 124. The count up control line and the Q output of the first binary 104 are connected to the other inputs of gate 122. When the count up line is high, the Q output of binary 104 eliminates every second clock pulse at the output of the transmission gate 120. Binary 102 changes state upon the application of these clock pulses to its clock input (C). A similar action takes place, when the countdown line to element 106 is high and the $\bar{Q}$ output is controlling the transmission of the clock pulses, except that the phase of the second binary 102 is displaced by 180°.

The motor drive logic consists of a decoder which provides control of the output switching transistors 130 through 136. These transistors are sequentially switched on (two transistors being on at any given time) to provide bi-phase control of the stepping motor 46. The direction in which the output transistors are sequentially energized determines the direction of rotation of the stepper motor 46, and therefore the position of the pointer 138. NOR gates 140 through 146 decode the four stages of the up/down counter into four individual output pulses. Incoming clock pulses to the up/down counter sequentially turn on one NOR gate at a time. Diodes 148–160 are arranged so as to turn on two adjacent transistors. The application of a NOR gate output pulse through respective base resistors of the transistors, drives the current necessary to saturate the transistor switches 130 through 136. Diodes 162 through 168 damp the reactive voltage surges generated by the inductive windings of the stepper motor 46.

The phase detector is an EXCLUSIVE-OR type gate implemented here with NAND gates 170 through 174. Applied to the inputs of gate 170 are the variable phase square wave and the inverted reference phase square wave from the transistor switch 175. Applied to the gate 174 inputs are the shifted reference phase square wave and the inverted variable phase square wave from the gate 177. The EXCLUSIVE-OR gate performs the logical function of providing a pulse, with a pulse width proportional to the phase difference between the reference and the variable phase square wave signals.

The relative output phase or phase error from the phase detector is converted to an equivalent dc voltage, by a two stage low pass filter comprising resistances 178 and 180 with capacitances 182 and 184. The filter passes the dc component of the phase detector output, while rejecting the ac component.

The voltage controlled oscillator (VCO) sets the rate of the pointer 138, by regulating the pulse repetition rate of pulses furnished to the up down counter. For large phase displacements the pulse rate of the VCO is high. As the error is decreased, the pulse rate is proportionately reduced. From the low pass filter, a dc voltage proportional to the phase displacement, is applied to the base of transistor 186. Potentiometer 188 is utilized to set the dc threshold for the voltage controlled oscillator. The emitter voltage on transistor 186 determines the current through resistor 190. Transistors 186, 192 and 194 form a high current gain amplifier, thus the current flowing through resistor 190 is essentially from the emitter of transistor 194. Further the emitter and collector currents of transistor 194 are practically the same. Therefore, the collector current of transistor 194 is controlled by the phase error magnitude in the phase detector. For small phase errors, the collector current of transistor 194 is drawn through transistor 196 and the emitter resistor 198. Since the bases of the transistors 196 and 200 are at the same voltage and because the emitter resistors are identical, the collector currents of the transistors are equal. The collector current of transistor 200 governs the charging rate of capacitors 202 and 204. Capacitor 202 can only be charged when transistor switch 206 is saturated. The unijunction transistor 208 acts as a capacitor discharge switch. After capacitor discharge, conduction through transistor 208 stops, and the capacitors are recharged. This continuous charge discharge process is the oscillation cycle of this relaxation circuit. A current bleeder resistor 210 sustains the oscillation under conditions of zero phase error.

The system also contains the feature that for large phase errors, the filtered phase detector voltage applied to gate 212 through the emitter follower 214 will exceed the switching threshold of the gate. For this condition the output of gate 212 switches low, and transistor 206 is cut off. This removes capacitance 202 from the circuit, increasing the oscillation rate.

The noise canceller eliminates the effect of undesirable spurious dc outputs from the phase detector by shorting the capacitance 182 to ground through transistor 216. Noise or phase jitter causes random direction control signals at the outputs of the direction sense binaries 94 and 96. The $\bar{Q}$ outputs of the boundaries 94 and 96 are isolated from each other, by an OR gate comprising diodes 218, 220 and resistance 222. A differentiator, comprising resistance 224 and capacitance 228, converts the noise induced dc level changes to pulses. These noise pulses switch on transistor 230 and charge capacitance 232 through emitter follower 234. The charge stored in capacitance 232 saturates the transistor switch 216 through resistance 236.

What is claimed is:

1. In a servo system including drive means for controlling output means in response to an error, said output means including feedback signal means to reduce said error, the combination comprising:
fourth means for providing second and third signals indicative respectively of the magnitude and polarity of said error;
fifth means coupled to said drive means and responsive to said third signal for controlling the direction of movement of said drive means;
sixth means coupled to said drive means and responsive to said second signal for providing continuously an energizing signal for said drive means, said sixth means including rate control means for establishing a given minimum rate of said drive means; and
further means coupled to said sixth means and responsive to said third signal for limiting the rate of said drive means to said given minimum rate in the presence of error polarity reversal indications of said third signal.

2. The invention according to claim 1, wherein: said drive means comprises means rotatable at a controlled rate
said sixth means includes rotational rate control means for establishing a minimum rotational rate for said drive means, error magnitude signal averaging means coupled to said rotational rate control means for varying said rotational rate above said minimum rate in response to said second signal, and said further means includes means for controlling the variation of said rotational rate by said averaging means irrespective of the value of said second signal.

3. The combination with a servo system including rotatable drive means for controlling output means in response to first and second signals indicative respectively of magnitude and polarity of an error, including feedback signal means to reduce said error comprising:
generating means continuously operable to provide a periodic energizing signal at a predetermined rate which determines the rotational speed of said drive means, said generating means including means for increasing said rate with respect to said predetermined rate in response to an input applied thereto,
means responsive to said first signal for applying to the input of said energizing means a third signal in accordance with the magnitude of said error,
further means responsive to said second signal for applying said energizing signal to said driven means in a manner to provide controlled rotation in a direction in accordance with the indication of polarity error of said second signal,
sensing means responsive to said second signal for providing a further signal indicative of reversals of the error polarity information of said second signal, and
means responsive to occurrence of said further signal for modifying said third signal as applied to said energizing means.

4. The invention according to claim 3, wherein said last mentioned means includes signal averaging means and means for disabling the input to said signal averaging means in response to said further signal.

5. The invention according to claim 3, wherein said last mentioned means includes means operable to limit the value of said third signal and therefore the rate of said energizing signal to a desired value.

6. The invention according to claim 3, and further including means for selectively controlling the duration of the modification of said third signal in response to the occurrence of said further signal.

7. The invention according to claim 3, wherein: said drive means comprises a motor having a plurality of winding capable of being selectively energized to control the direction of rotation of said drive means; said further means includes logic means coupled to said energizing means and responsive to said second signal, for generating direction control signals corresponding with the presence of indicated polarity error of said second signal and for selectively applying said energizing signal to said windings in accordance with the presence of said direction control signals.

8. In combination, a servo system including rotatable drive means for positioning an output means in response to the phase difference between first and second inputs, comprising:
variable phase shifting means responsive to said first input for providing a third signal phase shifted by an amount in accordance with a control input of said shifting means;
phase difference sensing means responsive to said second and third signals for providing fourth and fifth signals in response respectively to the magnitude and relative polarity of the phase difference between the inputs thereto;
pulse generating means for continuously providing an energizing signal for said drive means at a pulse repetition rate at least equal to a given rate;
first control means responsive to said fourth signal for varying the rate of said energizing signal above said given rate in response to the magnitude of said phase error;
second control means coupled to said pulse generating means and responsive to said fifth signal for enabling rotation of said drive means in a given direction in accordance with the presence of relative polarity phase error between said third signal and said second signal, means coupling said output means and the control input of said phase shifting means to said drive means and responsive to the rotation thereof for shifting said first signal in a manner to reduce the phase difference between said second and third signals, and
means coupled to said second control means and responsive to reversals of the relative polarity of said phase error for disabling the operation of said first control means.

9. The invention according to claim 8, wherein: said drive means is a stepping motor having a plurality of energizable windings; said first control means includes, filter means for averaging the magnitude of said phase error as applied to said pulse generating means; said second control means includes, first switching means for selectively enabling said motor windings in a controlled sequence, logic means responsive to the relative polarity of said phase error for controlling said first switching means; and said last mentioned means includes, further switching means operable in a first condition to disable the input to said filter means, and means including further logic means responsive to said polarity reversals of said phase error for disposing said further switching means in said first condition for a given duration.

* * * * *